United States Patent Office 3,385,828
Patented May 28, 1968

3,385,828
N-SULFONYL-1-OXA-3-AZA-CYCLOALKANE AND COPOLYMERS THEREOF WITH TRIOXANE
Ernst-Ulrich Köcher, Kuno Wagner, and Wolfgang von der Emden, Leverkusen, Germany, assignors to Farbenfabriken Bayer Aktiengesellschaft, Leverkusen, Germany, a corporation of Germany
No Drawing. Filed Apr. 26, 1965, Ser. No. 451,014
Claims priority, application Germany, June 18, 1964, F 43,199
24 Claims. (Cl. 260—67.5)

ABSTRACT OF THE DISCLOSURE

Copolymers of trioxane and 0.5 to 50 mol percent based on the trioxane of an N-sulfonyl-1-oxa-3-aza-cycloalkane.

The invention relates to new thermostable formaldehyde copolymers and to a process for the production of these copolymers in which formaldehyde or its oligomers, for example trioxane, is polymerised in the presence of cyclic organic nitrogen compounds.

It is known that many methods exist for converting formaldehyde into linear polymers of varying chain length. However, these polyoxymethylenes are readily and quantitatively degraded into monomeric formaldehyde by heat treatment.

Trioxane, the cyclic trimer of formaldehyde, may also be polymerised in the presence of cationically active catalysts, in particular Lewis acids, to form linear polyoxymethylenes. Unfortunately, the resulting polymers are thermolabile. The thermostability of polyoxymethylenes may be increased considerably by modifying their terminal groups, as was established as early as in 1930 by H. Staudinger who introduced terminal acetyl groups or methoxy groups. The introduction of terminal alkyl groups yields products which, in addition to their high thermostability, also exhibit a high resistance to alkalis on account of their pure polyacetal structure.

Unfortunately, the thermostability of polyoxymethylenes modified in this way is still not high enough for industrial purposes because acids and oxygen break up the polyoxymethylene chains internally, which in turn causes complete degradation of the affected molecules. Two solutions to this problem already have been put forward. In one case, the effects of oxygen and acids may be counteracted by introducing stabilising additives which inhibit degradation. In the other case, copolymers which not only contain (—CH$_2$O—) units but also, to a small extent, (—CH$_2$—CH$_2$.O—)

units, are prepared from trioxane and cyclic ethers, acetals and lactones. Degradation which is already in progress is arrested at such an ethylene group. Products of this type are similar in their behaviour to those obtained by subsequent terminal group alkylation of polyoxymethlylenes, i.e. they remain very susceptible to the effects of acids and oxidation.

For this reason, stabilising additives also have to be used with these copolymers.

The thermostability of polyoxymethylenes may be further improved by simultaneously using cyclic comonomers containing sulphur atoms. In this case, however, the polymerisation velocity of the monomer mixture is reduced so that there are limits in practice to the quantities in which these comonomers may be used.

Object of the present invention is a process for the production of formaldehyde copolymers having an improved thermostability wherein trioxane is copolymerised with cyclic, organic nitrogen compounds of the general formula:

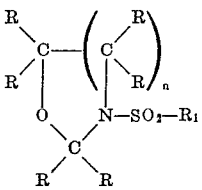

in the presence of cationically active catalysts. In this general formula, R represents hydrogen, a lower alkyl radical having 1 to 6 carbon atoms or a halogeno lower alkyl radical having 1 to 6 carbon atoms, $R_1$ represents an alkyl radical, aryl radical, aralkyl radical or alkaryl radical, these radicals containing up to 20 carbon atoms, and $n$ represents an integer from 1 to 3.

Alkyl radicals are preferably linear or branched alkyls having 1 to 6 carbon atoms, preferred aryl radicals are the radicals of benzene, naphthalene, anthracene, diphenyl, and examples for aralkyl radicals are $C_1$ to $C_6$ alkyl substituted phenyl radicals which are bonded via the alkyl and examples for alkaryl radicals are phenyl radicals, which are substituted by one, two or three $C_1$ to $C_6$ alkyl, and bonded via the phenyl radical.

The ring system therefore always contains one

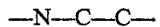

group and, in addition, a ring oxygen atom, in which case the nitrogen atom is linked with the radical $R_1$ via a sulphonyl-sulphur atom. The compounds are therefore to be regarded as 1-oxa-3-aza-cycloalkanes with 5 or more ring members, and, on the other hand, as sulphonamides, and named N-sulphonyl-1-oxa-3-aza-cycloalkanes.

The class of compounds thus defined includes, for example, N-methane-sulphonyl-oxazolidine, N-methane-sulphonyl-tetrahydro-1,3-oxazine, N-benzene-sulphonyl-oxazolidine, N-p-toluene-sulphonyl-tetrahydro-1,3-oxazine, N-p-toluene-sulphonyl-4-methyl-oxazolidine and N-(C$_{12-18}$-alkane-sulphonyl)-oxazolidine.

In the process according to the invention, these comonomers are preferably used in quantities varying from about 0.5 to 5 mol percent, based on the amount of trioxane used, if the polymer is intended to exhibit the properties of the polyoxymethylene. The comonomer may also be used in larger quantities, i.e. up to 50 mol percent, if it is desired to obtain a polymer with modified properties, for example a lower melting point, a lower degree of crystallisation and greater solubility in organic solvents.

Some of the co-monomers used according to the invention, i.e. the types with 5 ring members, may be prepared by known processes (cf. U.S.A. patent specification No. 2,722,531). The types comprising 6 or 7 ring members may be obtained, for example, as follows:

The N-sulphonyl-tetrahydro-1,3-oxazines (6 ring members) corresponding to Formula I, with $n=2$ may be prepared by reacting the corresponding oxazines with sulphonic acid chlorides in the presence of inorganic or organic bases, optionally in inert organic solvents or water, at temperatures in the range from about 0 to 100° C. It even would be possible to react 1,3-propanolamines which, although optionally substituted, must contain one free amino group, with sulphonic acid chlorides to form the N-(hydroxypropylene)-sulphonic acid amides and to cyclise these compounds into the oxazines with aldehydes or aliphatic ketones or aliphatic-aromatic ketones in the presence of acids having a dissociation constant of at least 10$^{-4}$. In this case, the acid may act as a solvent, although other solvents may be used at the same time.

The N-sulphonyl-1-oxa-3-azacycloheptanes (7 ring members) corresponding to Formula I, with $n=3$ may be similarly obtained.

Surprisingly, the co-monomers used according to the invention do not affect the polymerisation velocity of trioxane, so that there is no need to use large quantities of catalyst. As a result, molecular weights in excess of 30,000 readily may be obtained even when the co-monomers are used in quantities of 10% by weight and more, based on the amount of trioxane present.

In addition to concentrated acids, such as $H_2SO_4$, $HClO_4$ or alkane sulphonic acids and p-toluene sulphonic acid, the following compounds are particularly suitable for use as the cationically active catalysts: compounds referred to as Lewis acids, for example boron trifluoride, boron trichloride, aluminium trichloride, ferric chloride, antimony pentachloride, titanium tetrachloride and tin tetrachloride as well as the fluorides of the aforementioned metals or even the addition compounds of boron trihalides, particularly boron trifluoride, with ethers, carboxylic acid esters, carboxylic acid anhydrides, amides, nitriles and mono- or dicarboxylic acid amides. Halogen-containing organometallic compounds of aluminium and tin, and oxonium salts and carboxonium salts (for example triethyl oxonium fluoborate and 2-methyl di-oxolenium fluoborate) are also suitable, as are fluoborates of aryl diazonium compounds which are transformed at high temperatures into aryl cations. In their case, transformation is accompanied by the elimination of nitrogen. The catalysts are added to the polymerisation medium in quantities of 0.001 to 1% by weight, based on the weight of the trioxane used.

Copolymerisation may be carried out as block polymerisation and is completed over a short period, producing an almost quantitative yield. In this case, the catalyst is melted together with the trioxane and the co-monomer simultaneously added. Alternatively, the trioxane is melted together with the co-monomer, followed by the addition of the catalyst, optionally in an inert solvent. However, it is possible to carry out polymerisation in suspension in an organic liquid in which trioxane is only soluble to a limited extent. For example, straight-chain aliphatic hydrocarbons with more than 8 carbon atoms or their mixtures, for example a $C_{12}$–$C_{18}$-fraction boiling at temperatures in the range from 230 to 320° C., are suitable for use in this case.

If polymerisation is carried out in solution, the following solvents may, for example, be used: Aliphatic and aromatic hydrocarbons and their chlorination products, for example benzene, toluene, hexane, heptane, cyclohexane, isooctane, test benzine, hydrogenated trimeric isobutylene and the corresponding chlorinated hydrocarbons.

In general, the polymerisation according to the invention is carried out at temperatures between 50 and 120° C., preferably between 70 and 110° C. In many cases, it may be carried out to advantage at about 70 to 85° C. In special cases, polymerisation may be carried out at temperatures below or above the range indicated above.

When heated, the copolymers are initially degraded to a certain extent before reaching their maximum stability. Such depolymerisation may be accelerated by heating the crude polymer in inert solvents, sometimes even in alcohols which form semi-acetals with the degraded formaldehyde. This reaction is preferably promoted by adding organic or inorganic bases which simultaneously destroy the polymerisation catalyst.

Copolymers having different molecular weights may be prepared, depending on the purpose for which the end products are to be used. High molecular weight copolymers whose reduced viscosity is between about 0.6 to 3.0, measured at 60° C. in a 0.5% solution of p-chlorophenol, are suitable for use as thermoplastic injection-moulding compositions or as a thermoplastic material for the production of fibres by melt-spinning or dry-spinning.

In the preparation of these copolymers, the organic nitrogen compound is preferably used in quantities varying from 0.5 to 5 mol percent, based on the trioxane used (expressed as $CH_2O$). For example, light stabilisers, dyestuffs, pigments and, in some cases, heat stabilisers and oxidation stabilisers, fillers or plasticisers may be added to these polymers.

If it is intended to use the copolymers as intermediates or auxiliaries in the producton of plastics, lower molecular weights, for example down to about 500, may be desirable. In this case, the nitrogen-containing co-monomer may be used in larger quantities, for example up to about 50 mol percent, based on monomeric formaldehyde. The resulting copolymers may exhibit an oily or resinous consistency at room temperature. Any increase in the amount of formaldehyde is accompanied by an increase both in the crystallinity and in the melting point of the copolymers.

It would also be possible to modify the properties of the copolymers to an even greater extent by additionally using other co-monomers, for example cationically polymerisable olefins or cyclic, organic oxygen or sulphur compounds. Examples of such compounds are styrene, acrylonitrile, ethylvinyl ether, methylvinyl sulphone or epoxy compounds such as ethylene oxide or propylene oxide, cyclic acetals such as 1,3-dioxolane or diethylene glycol formal, as well as their thioanalogues, such as ethylene sulphide, propylene sulphide, 1,3-oxthiolane or thiodiglycol formal.

The copolymers produced by the process according to the invention do not reach their outstanding maximum thermostability until they have been subjected to brief heat or chemical treatment, during which very small amounts are degraded. This may be done by heating the copolymers to temperatures between 120° and 200° C. and higher in substance or in suspension, for example in hydrocarbons of high boiling point or even in solution, for example in dimethyl formamide, butyrolactone or dimethyl sulphoxide. Labile components, however, may even be degraded by the action of aqueous sodium hydroxide solution or of alcohols with up to 6 carbon atoms, for example cyclohexanol, in the presence of basic compounds. Alkali metal hydroxides or organic bases, such as pyridine, tri-n-butylamine, alkanolamines etc. are suitable for use as the basic compounds. Degradation up to the formation of terminal co-monomer units may even be carried out during granulation in the extruder, in which case organic bases may be added if desired.

Example 1

300 g. of trioxane, 14.2 g. of N-benzene-sulphonyl-oxazolidine and 300 ml. of a saturated hydrocarbon fraction (B.P. 230–320° C.) were reacted at 70° C. while stirring with 0.17 g. of boron fluoride dibutyl etherate. The temperature was raised to 85° C. and the copolymer precipitated from the mixture as a powder after only a few seconds. After 5 hours at ambient temperature of 70° C., the polymer was suction-filtered, washed with methylene chloride and then with acetone. The polymer was obtained in a yield of 256 g. (air-dried). The thermostability of the material was measured after it had been treated for 10 hours with 5% sodium hydroxide at 95° C. Its reduction in weight at 222° C. was 2% pH. The intrinsic viscosity, measured in p-chlorophenol at 60° C. in 0.5% solution produced a value of $\eta_i = 1.19$.

Example 2

300 g. of trioxane, 15.2 g. of N-benzene-sulphonyl-tetrahydro-1,3-oxazine and 300 ml. of a saturated hydrocarbon fraction were reacted as in Example 1. The yield was 250 g. (air-dried). The reduction in weight at 222° C. was 1.9% per hour. The intrinsic viscosity yielded a value of $\eta_i = 0.891$.

Example 3

300 g. of trioxane, 15.2 g. of N-toluene-sulphonyloxazolidine and 300 ml. of a saturated hydrocarbon fraction were reacted as in Example 1. The yield was 267 g. (air-dried). The reduction in weight amounted to 2% per hour at 222° C. The instrinsic viscosity, measured in p-chlorophenol at 60° C. in 0.5% solution, was $\eta_i=0.942$.

Example 4

300 g. of trioxane, 16.1 g. of N-toluene-sulphonyl-tetrahydro-oxazine and 300 ml. of a saturated hydrocarbon fraction are reacted as in Example 1. The yield was 275 g. (air-dried). The intrinsic viscosity, measured as in Example 3, amounted to $\eta_i=1.03$.

What is claimed is:

1. N-sulphonyl-1-oxa-3-aza-cycloalkanes of the general formula

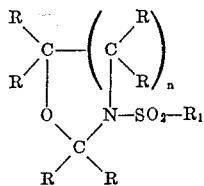

wherein R is a member of the group consisting of hydrogen, alkyl having 1 to 6 carbon atoms and halogenoalkyl having 1 to 6 carbon atoms, $R_1$ is selected from the group consisting of an alkyl radical having 1 to 6 carbon atoms, an aryl radical, an aralkyl radical and an alkaryl radical and $n$ is one of the numbers 2 and 3.

2. N-sulphonyl-tetrahydro-1,3-oxazines of the formula

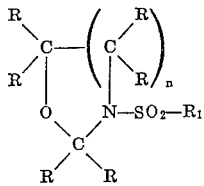

wherein R is a member of the group consisting of hydrogen, alkyl having 1 to 6 carbon atoms and halogenoalkyl having 1 to 6 carbon atoms, $R_1$ is selected from the group consisting of an alkyl radical having 1 to 6 carbon atoms, an aryl radical, an aralkyl radical and an alkaryl radical.

3. N-sulphonyl-1-oxa-3-aza-cycloheptanes of the formula

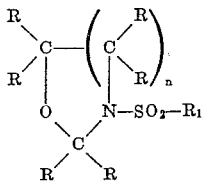

wherein R is a member of the group consisting of hydrogen, alkyl having 1 to 6 carbon atoms and halogenalkyl having 1 to 6 carbon atoms and $R_1$ is selected from the group consisting of an alkyl radical having 1 to 6 carbon atoms, an aryl radical, an aralkyl radical and an alkaryl radical.

4. N-methane-sulphonyl-tetrahydro-1,3-oxazine.

5. N-p-toluene-sulphonyl-tetrahydro-1,3-oxazine.

6. Process for producing N-sulphonyl-1-oxa-3-aza-cycloalkanes of the general formula

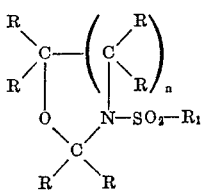

wherein R is a member of the group consisting of hydrogen, alkyl having 1 to 6 carbon atoms and halogenoalkyl having 1 to 6 carbon atoms, $R_1$ is selected from the group consisting of an alkyl radical having 1 to 6 carbon atoms, an aryl radical, an aralkyl radical and an alkaryl radical and $n$ is one of the numbers 2 and 3, which comprises reacting the corresponding 1-oxa-3-aza-cycloalkanes with sulphonic acid chlorides in the presence of a base at a temperature of between 0 and 100° C.

7. A copolymer produced by copolymerizing trioxane at a temperature of between 50 and 120° C. in the presence of a cationically active catalyst with 0.5 to 50 mol percent, based on trioxane, of a cyclic nitrogen compound of the formula:

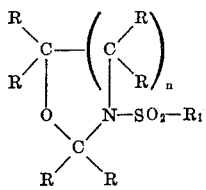

wherein R is hydrogen, alkyl having 1 to 6 carbon atoms or haloalkyl having 1 to 6 carbon atoms, $R_1$ is alkyl having 1 to 6 carbon atoms, aryl, aralkyl or alkaryl and $n$ is an integer from 1 to 3.

8. The copolymer of claim 7 wherein $n$ is 1.

9. The copolymer of claim 7 wherein $n$ is 2.

10. The copolymer of claim 7 wherein $n$ is 3.

11. The copolymer of claim 7 wherein said cyclic nitrogen compound is N-benzene-sulphonyl-oxazolidine.

12. The copolymer of claim 7 wherein said cyclic nitrogen compound is N-benzene-sulphonyl-tetrahydro-1,3-oxazine.

13. The copolymer of claim 7 wherein said cyclic nitrogen compound is N-toluene-sulphonyl-oxazolidine.

14. The copolymer of claim 7 wherein said cyclic nitrogen compound is N-toluene-sulphonyl-tetrahydro-oxazine.

15. Process for producing copolymers of trioxane and a cyclic nitrogen compound of the formula

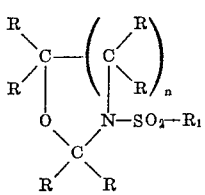

wherein R is a member of the group consisting of hydrogen, alkyl having 1 to 6 carbon atoms and halogenoalkyl having 1 to 6 carbon atoms, $R_1$ is selected from the group consisting of an alkyl radical having 1 to 6 carbon atoms, an aryl radical, an aralkyl radical and an alkaryl radical and $n$ is one of the numbers 1, 2 and 3, which comprises polymerising trioxane and 0.5 to 50 mol percent of said compound in the presence of a cationically active catalyst at a temperature of between 50 and 120° C.

16. Process according to claim 15, wherein said cationically active catalyst is selected from the group consisting of a concentrated mineral acid, a sulphonic acid, a Lewis acid, a boron halide etherate and a halogen containing organic aluminum compound.

17. Process for producing copolymers of trioxane, a cyclic nitrogen compound of the formula

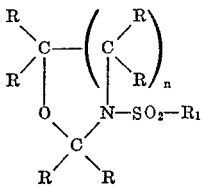

wherein R is a member of the group consisting of hydrogen, alkyl having 1 to 6 carbon atoms and halogenoalkyl having 1 to 6 carbon atoms, $R_1$ is selected from the group consisting of an alkyl radical having 1 to 6 carbon atoms, an aryl radical, an aralkyl radical and an alkaryl radical and $n$ is one of the numbers 1, 2 and 3, and a further cyclic compound containing a ring member selected from the group consisting of oxygen and sulfur which comprises copolymerising trioxane and 0.5 to 50 mol percent of said cyclic compound of said formula in the presence of a cationically active catalyst at a temperature of between 50 and 120° C.

18. Process according to claim 15, wherein said polymerisation is carried out in suspension in an organic solvent.

19. Process according to claim 15, wherein said polymerisation is carried out as a block polymerisation in the melt.

20. Process according to claim 15, wherein said polymerisation is carried out as a solution polymerisation in an organic solvent.

21. Process according to claim 15, wherein said cyclic nitrogen compound is N-benzene-sulphonyl-oxazolidine.

22. Process according to claim 15, wherein said cyclic nitrogen compound is N-benzene-sulphonyl-tetrahydro-1,3-oxazine.

23. Process according to claim 15, wherein said cyclic nitrogen compound is N-toluene-sulphonyl-oxazolidine.

24. Process according to claim 15, wherein said cyclic nitrogen compound is N-toluene-sulphonyl-tetrahydro-oxazine.

References Cited
UNITED STATES PATENTS

| | | | |
|---|---|---|---|
| 2,722,531 | 11/1955 | Ratz | 260—307 |
| 3,304,287 | 2/1967 | Kiss | 260—67.6 |

WILLIAM H. SHORT, *Primary Examiner.*

E. M. WOODBERRY, *Assistant Examiner.*